United States Patent
Konishi et al.

[11] Patent Number: 6,152,697
[45] Date of Patent: Nov. 28, 2000

[54] STEAM TURBINE DIFFERENT MATERIAL WELDED ROTOR

[75] Inventors: Tetsu Konishi; Ryotaro Magoshi, both of Takasago, Japan

[73] Assignee: Mitsubishi Heavy Industries, Ltd., Tokyo, Japan

[21] Appl. No.: 09/327,557

[22] Filed: Jun. 8, 1999

[30] Foreign Application Priority Data

Jun. 9, 1998 [JP] Japan .................................. 10-160602
Apr. 8, 1999 [JP] Japan .................................. 11-100908

[51] Int. Cl.[7] ...................................................... F01D 5/06
[52] U.S. Cl. .................................. 416/213 R; 416/201 R; 416/198 A; 416/61
[58] Field of Search ........................... 415/199.4, 199.5, 415/200, 216.1; 416/213 R, 201 R, 198 A, 61, 244 A; 228/105, 189

[56] References Cited

U.S. PATENT DOCUMENTS 3,876,335  4/1975  Forcinal et al. .................... 416/198
3,967,919  7/1976  Coulon et al. .................... 416/198 A
4,696,544  9/1987  Costella ............................. 350/96.26
4,962,586  10/1990  Clark et al. ....................... 29/889.2
5,052,803  10/1991  Krauter ............................. 356/241

*Primary Examiner*—Edward K. Look
*Assistant Examiner*—Ninh Nguyen
*Attorney, Agent, or Firm*—Wenderoth, Lind & Ponack, L.L.P.

[57] ABSTRACT

A steam turbine different material welded rotor, constructed by rotors of different materials being jointed together by welding has the strength of a jointed portion increased and inspection of the jointed portion facilitated. A bearing portion rotor 1 and high temperature portion rotor 2 are jointed at weld portion A, the high temperature portion rotor 2 and low temperature portion rotor 3 at weld portion B and the low temperature portion rotor 3 and bearing portion rotor 4 at weld portion C. Cavity portions 5, 6 are formed in the weld portions B, C, respectively. Inspection holes 7, 8 are also provided in the weld portions B, C. The high temperature portion rotor 2 is made of high heat resistant 12Cr steel and other rotors are made of low alloy steel, wherein the rotor 1 is of 2·¼ CrMoV steel and the rotors 3, 4 are of 3·½ NiCrMoV steel. Thus, the materials are less expensive and inspection of the weld portions becomes facilitated by the inspection holes 7, 8 and the cavity portions 5, 6.

4 Claims, 6 Drawing Sheets

STEAM TURBINE DIFFERENT MATERIAL WELDED ROTOR

BACKGROUND OF THE INVENTION

1. Field of the Invention

The present invention relates generally to a steam turbine 'different material' welded rotor, and more specifically to one having different materials of a high temperature portion and a low temperature portion jointed together by welding with an increased joint strength and facilitating inspection of defects in the rotor.

2. Description of the Prior Art

In a recent steam turbine rotor, following a tendency to high temperatures of steam, a 12% chromium steel is used, as it is excellent in high temperature strength and toughness. In such a rotor, both for a high temperature portion exposed to a high temperature steam and a low temperature portion exposed to a low temperature steam, the same 12% chromium steel is used. But as the rotor has become large-sized in recent years, it is becoming difficult to manufacture the rotor so as to satisfy characteristics both of the high temperature portion and the low temperature portion with one material. Also, it is practice to use the 12% chromium steel for manufacture of the rotor portion and to use a low alloy steel for sleeves around the rotor, couplings and the like.

While the 12% chromium steel, which is an expensive material, satisfies heat resistance, creep characteristic, etc. of the portion exposed to the high temperature steam, it is not necessary to use such an expensive material for the low temperature portion, but rather toughness is required therefor, and a low temperature material may well respond thereto. In order to meet these problems, as shown in FIG. 7 for example, it is attempted to joint rotor portions of different materials together by welding to make a single rotor.

In FIG. 7, numeral 31 designates a turbine rotor of the 12% chromium steel to be applied to the high temperature portion, and numeral 32 designates a turbine rotor of a low alloy steel to be applied to the low temperature portion, the low alloy steel being an alloy steel containing chromium, molybdenum, vanadium, nickel, etc. Numeral 33 designates a clad portion, which is made of a 9Cr steel and is provided to an end portion 34 of the turbine rotor 31. Numeral 35 designates a groove, which is formed between the clad portion 33 and the turbine rotor 32 to be jointed together by welding via a weld metal 36 to constitute a single rotor.

As described above, the steam turbine rotor, extending from the high temperature portion to the low temperature portion, comprises a portion exposed to a high temperature high pressure steam and a portion exposed to a low temperature low pressure steam. This steam turbine rotor has so far been made in one unit by a single material of the 12% chromium steel, but the 12% chromium steel is expensive, and for this reason, an attempt is being made to joint the rotor portions of different materials to make one rotor, as shown in FIG. 7. But, in such a steam turbine rotor in the prior art as having different materials jointed together, there is a problem in that the weld strength differs according to a position in the joint portion, and moreover, there is paid no attention to a rotor structure to enable a sufficient post-weld inspection of defects.

SUMMARY OF THE INVENTION

In view of the problems in the prior art, therefore, it is an object of the present invention to provide a steam turbine different material welded rotor, constructed by jointing different materials, in which a shape of the joint portion is devised and a weld structure is employed so as to increase strength of the joint portion, and the rotor structure is made so as to enable a sufficient inspection of the joint portion.

In order to attain the object, the present invention provides (1) to (3) below.

(1) A steam turbine different material welded rotor is constructed by rotors divided into a high temperature portion and a low temperature portion and made of different materials being jointed together by welding. A circular recess portion is provided in a central portion of end face to be jointed of each of the rotors. An annular end face of a peripheral portion of the end face is jointed by welding to an annular end face of an adjacent one of the rotors so that a cavity portion is formed in the central portion of the end faces so jointed and an inspection hole is provided passing through from a rotor outer surface to the cavity portion.

(2) A steam turbine different material welded rotor as mentioned in (1) above has the steam turbine different material welded rotor constructed by rotors divided into a bearing portion, a high temperature portion and a low temperature portion and made of different materials being jointed together by welding.

(3) A steam turbine different material welded rotor as mentioned in (1) or (2) above has a projection portion which projects inwardly toward a central portion of the cavity portion along a central portion of an inner circumferential surface of a jointed portion of the annular end faces.

In the invention of (1) above, the rotors are divided into the high temperature portion and the low temperature portion, for example the high temperature portion of the intermediate position and the low temperature portion of each end of the rotor, and are jointed together by welding to form a single rotor. Also, in the invention of (2) above, the rotors are divided into the bearing portion of each end of the rotor, the high temperature portion and the low temperature portion, and are jointed together by welding to form a single rotor.

In such a steam turbine different material welded rotor, there is formed the cavity portion in each of the weld portions and the inspection hole is provided passing through from the rotor outer surface to the cavity portion. Hence, by the inspection hole, a fiberscope, for example, is inserted into the cavity portion and the surroundings of the welded joint portion can be inspected.

In the invention of (3) above, there is provided the projection portion which projects inwardly toward the central portion of the cavity portion along the central portion of the inner circumferential surface of the jointed portion or along the central portion of the circumferential periphery of the cavity portion. Hence, the tensile stress at the weld portion is dispersed more in the inner portion than in the outer portion in the rotor radial direction due to the projection portion to be weakened and breakage at the inner portion of the weld portion due to thermal stress can be prevented. Where R is a radius of the curved surface forming the projection portion and L is a length of the tip surface of the projection portions after being jointed, the stress reduction effect will be maximized in a range of L/R being larger than 2 and smaller than 3 ($2 < L/R < 3$).

BRIEF DESCRIPTION OF THE DRAWINGS

FIG. 2 is a cross sectional view showing weld structures of weld portions A, B, C of FIG. 1, wherein

FIG. 3 is a partially enlarged cross sectional view of FIG. 1, wherein

FIG. 6 is a partially enlarged cross sectional view of FIG. 5, wherein

DESCRIPTION OF THE PREFERRED EMBODIMENTS

Figure 1:
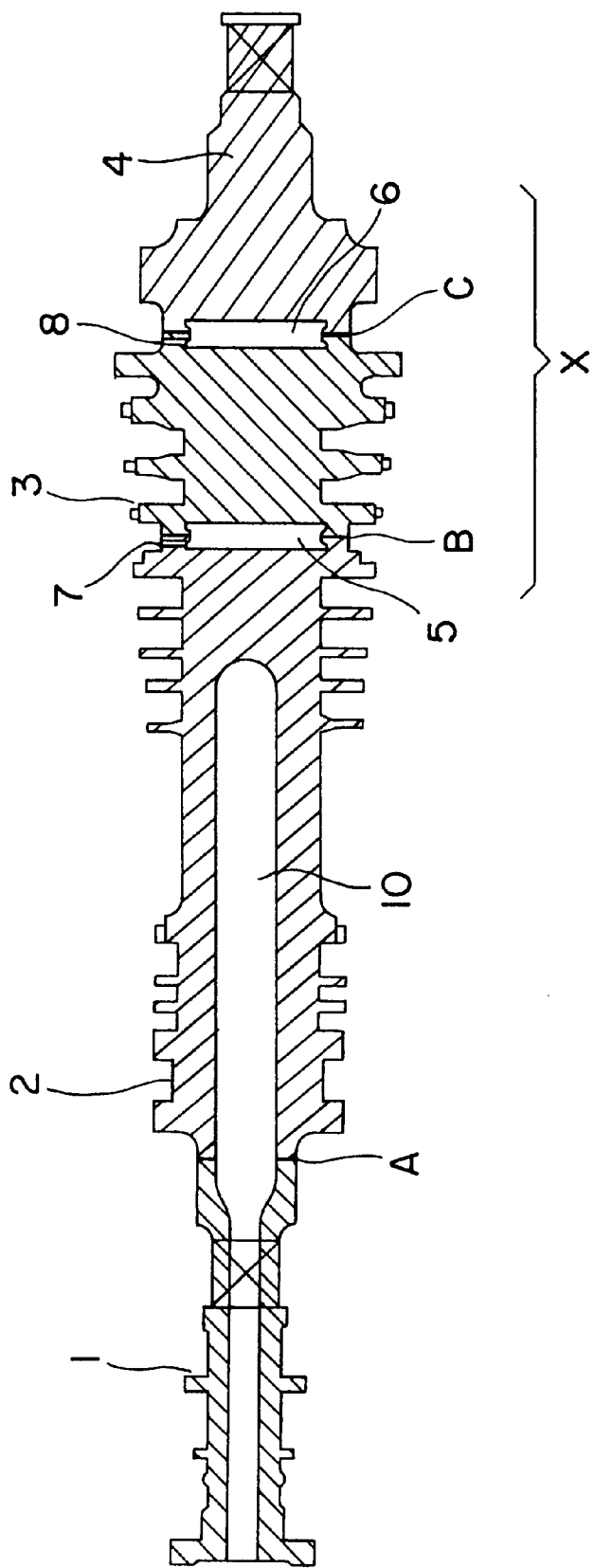
FIG. 1 is a cross sectional view of a steam turbine different material welded rotor of a first embodiment according to the present invention.

Herebelow, description will be made concretely on embodiments according to the present invention with reference to the figures. FIG. 1 is a cross sectional view of a steam turbine different material welded rotor of a first embodiment according to the present invention. In FIG. 1, numeral 1 designates a bearing portion rotor, numeral 2 designates a high temperature portion rotor, numeral 3 designates a low temperature portion rotor and numeral 4 designates a bearing portion rotor on a low temperature side. The bearing portion rotor 1 and the high temperature portion rotor 2 at a weld portion A, the high temperature portion rotor 2 and the low temperature portion rotor 3 at a weld portion B and the low temperature portion rotor 3 and the bearing portion rotor 4 at a weld portion C, respectively, are jointed together by welding so as to constitute a single steam turbine rotor.

The bearing portion rotor 1, being in a low temperature portion, is made of a 2·¼ CrMoV (chromium. molybdenum.vanadium) steel. The high temperature portion rotor 2, being exposed to a high temperature steam so as to be in the thermally severest portion, is made of a 12Cr steel, which is excellent in high heat resistance and strength. The low temperature portion rotor 3, while being likewise exposed to steam, because this steam is of a comparatively low pressure and low temperature as compared with the high temperature portion rotor 2, is made of a 3·½ NiCrMoV (nickel.chromium. molybdenum.vanadium) steel, and the bearing portion rotor 4 is also made of the same material as this.

The weld portions B, C which relate to the rotors 2, 3 exposed to the high temperature steam and the low temperature steam, respectively, are important portions as turbine moving blades are fitted therearound, and are so structured that there are provided cavity portions 5, 6 to enable inspection of the surroundings of the weld portions B, C, as described later. It is to be noted that in the weld portion A which relates to the bearing portion in a low temperature portion, a fiberscope or the like may be inserted into a hollow portion 10 for inspection, hence there is no specific need to employ such a structure as the weld portions B, C, but, needless to mention, such structure may be employed for the weld portion A, as the case may be.

Figure 2A:
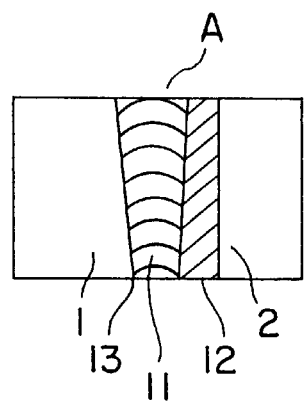
FIG. 2(a) is of the weld portion A.
Figure 2B:
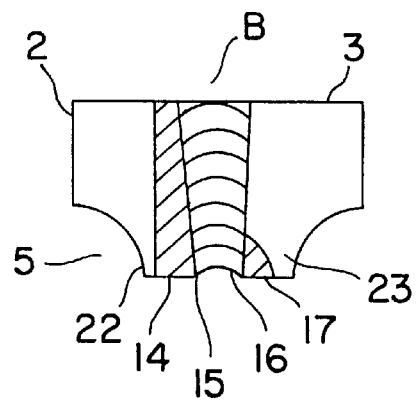
FIG. 2(b) is of the weld portion B and FIG. 2(c) is of the weld portion C.
Figure 2C:
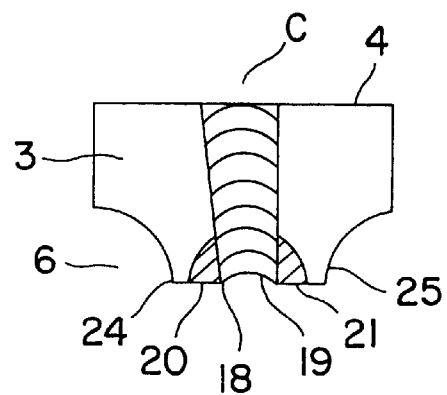

FIG. 2 is a cross sectional view showing weld structures of the weld portions A, B, C of FIG. 1, wherein FIG. 2(a) is of the weld portion A, FIG. 2(b) is of the weld portion B and FIG. 2(c) is of the weld portion C. In FIG. 2(a), the high temperature portion rotor 2 is made of a high heat resistant material of the 12Cr steel and is provided with a softening prevention measure by a clad portion 12 of a 9Cr steel. The bearing portion rotor 1 is made of the 2·¼ CrMoV steel and there is worked a groove 13 between the bearing portion rotor 1 and the clad portion 12 so that welding is applied there by a weld metal 11.

In FIG. 2(b), the high temperature portion rotor 2 is made of the 12Cr steel, a projection portion 22 is formed to project inwardly toward a central portion of the cavity portion 5 and a clad portion 14 made of the 9Cr steel is provided, as in the weld portion A of FIG. 2(a). The low temperature portion rotor 3 is made of the 3·½ NiCrMoV steel and is likewise formed with a projection portion 23 and there is worked a groove 15 between itself and the clad portion 14 so that welding is applied there by a weld metal 16. Also, there is applied a welding of a 2·¼ CrMo Steel to a corner portion 17 of the low temperature portion rotor 3 so that cracks caused by repeated heating may be prevented.

In FIG. 2(c), the low temperature portion rotor 3 is made of the 3·½ NiCrMoV steel and is formed with a projection portion 24 projecting into the cavity portion 6, and the bearing portion rotor 4 is made of the same material and is likewise formed with a projection portion 25. There is worked a groove 18 between the low temperature portion rotor 3 and the bearing portion rotor 4 so that welding is applied there by a weld metal 19. Also, as a countermeasure for cracks caused by repeated heating, welding of the 2·¼ CrMo steel is applied to both corner portions 20, 21 of the low temperature portion rotor 3 and the bearing portion rotor 4.

Figure 3A:
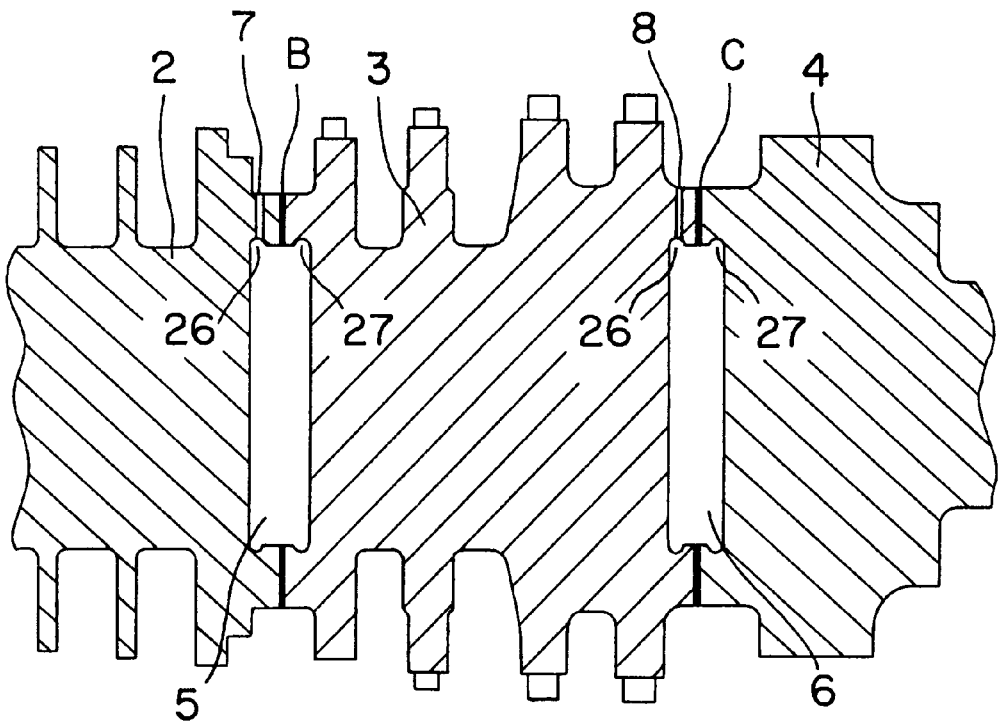
FIG. 3(a) is that of X portion covering the weld portions B, C
Figure 3B:
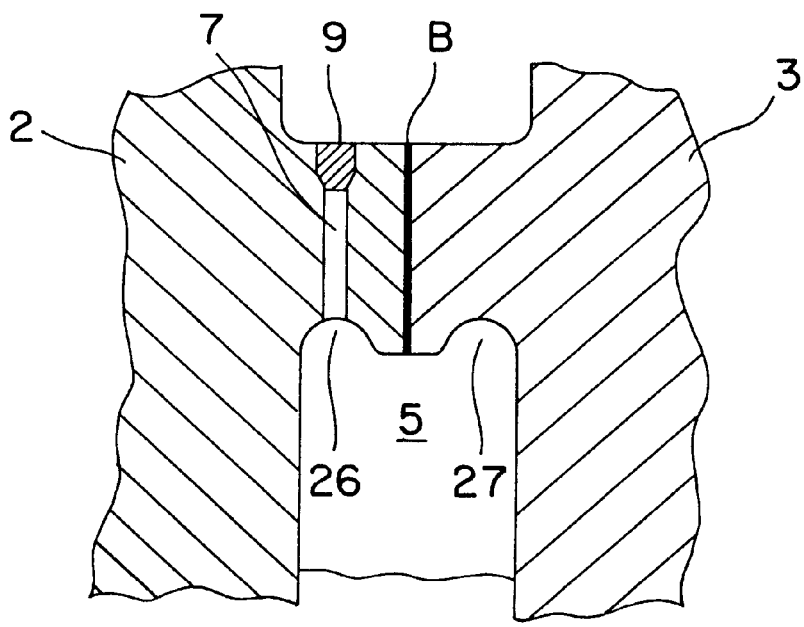
FIG. 3(b) is a further enlarged cross sectional view of the weld portion B of FIG. 3(a).

FIG. 3 is a partially enlarged cross sectional view of FIG. 1, wherein FIG. 3(a) is that of X portion covering the weld portions B, C and FIG. 3(b) is a further enlarged cross sectional view of the weld portion B of FIG. 3(a). In FIG. 3, there are provided circular recess portions 26, 27 in central portions of respective rotor end faces to be jointed in the weld portions B, C, respectively, so that the cavity portions 5, 6 are formed by a right and left pair of the recess portions 26, 27 in the respective welded joint portions. Also, there are provided inspection holes 7, 8 passing through from rotor outer circumferential surface to the respective cavity portions 5, 6.

In FIG. 3(b), if comparison is made between the high temperature portion rotor 2 and the low temperature portion rotor 3, the high temperature portion rotor 2 which is made of the 12Cr steel has a smaller thermal expansion coefficient, hence the low temperature portion rotor 3 expands and contracts quicker. Thus, the inspection hole 7 is provided to pass through to the cavity portion 5 in the high temperature portion rotor 2 side which is of the smaller thermal expansion coefficient to receive less thermal influence. The inspection hole is provided adjoining the weld portion in one piece of hole, or in plural pieces thereof as the case may be, along the rotor outer circumference.

Also, the inspection hole 7 is usually closed by a plug 9, and when inspection is to be done, the plug 9 is removed and a fiberscope or the like is inserted into the cavity portion 5 through the inspection hole 7 for inspection of the surroundings of the weld portion B. If the plug 9 is fitted in engagement via a thread or the like with the inlet portion of the inspection hole 7, fitting and removing the plug 9 will be facilitated. Also, in the weld portion C, while the low temperature portion rotor 3 and the bearing portion rotor 4 are of the same material, the inspection hole 8 is provided in a higher temperature side as in the weld portion B.

Figure 4:
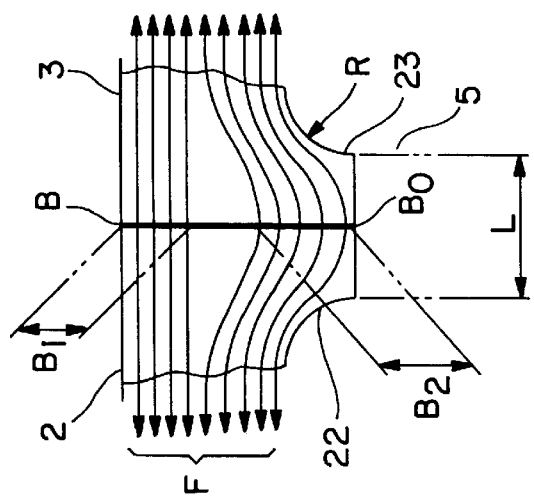
FIG. 4 is a view showing stress distribution in the weld portion B.

FIG. 4 is a view showing stress distribution in the weld portion B. In FIG. 4, there are formed the projection portions 22, 23 on the cavity portion 5 side of the joint portion of the high temperature portion rotor 2 and the low temperature portion rotor 3 and the joint portion of the weld portion B receives tensile stress F due to thermal expansion. While this stress acts linearly in the right and left direction in the figure in the vicinity of a weld portion $B_1$, it is dispersed due to the projection portions 22, 23 in the vicinity of a weld portion $B_2$ to become weaker than in the weld portion $B_1$, hence cracks caused by the tensile stress at a weld portion $B_0$ can be prevented. In FIG. 4, where R is a radius of curved surface forming the projection portions 22, 23 and L is a length of tip surfaces both of the projection portions 22, 23, the stress reduction effect will be maximized in a range of L/R being larger than 2 and smaller than 3 (2<L/R<3).

Thus, in the weld portions of the different material welded rotor of the first embodiment, especially in the weld portions B, C, there are provided the cavity portions 5, 6 as well as the projection portions 22 and 23, 24 and 25 on the cavity portions 5, 6 side in a shape to weaken the tensile stress due to the thermal expansion, whereby the different material welded rotor in which rotors made of different materials are jointed together is increased in strength. Moreover, there are provided the inspection holes 7, 8 passing through to the cavity portions 5, 6, whereby inspection of the joint portions becomes facilitated.

Figure 5:
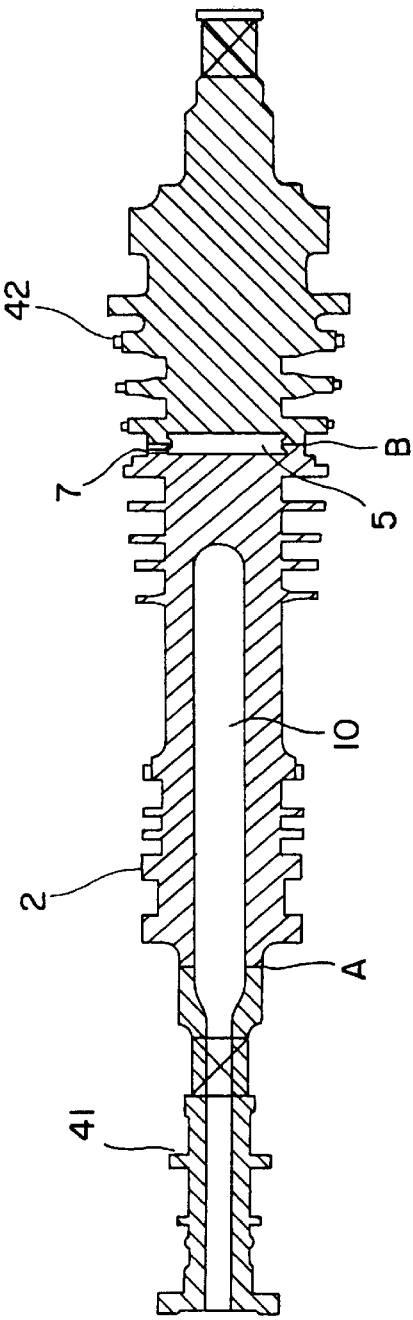
FIG. 5 is a cross sectional view of a steam turbine different material welded rotor of a second embodiment according to the present invention.

FIG. 5 is a cross sectional view of a steam turbine different material welded rotor of a second embodiment according to the present invention. In this second embodiment, what is different from the first embodiment shown in FIG. 1 are portions of low temperature portion rotors shown by reference numerals 41, 42. A high temperature portion rotor 2 and its inside structure are same as those shown in FIG. 1.

In FIG. 5, the low temperature portion rotor 41 and the high temperature portion rotor 2 are jointed together at a weld portion A and the high temperature portion rotor 2 and the low temperature portion rotor 42 are jointed together at a weld portion B so that a single steam turbine rotor is formed. The low temperature portion rotors 41, 42 are in low temperature portions and are made of a CrMoV (chromium.molybdenum. vanadium) steel. The weld portion B which relates to the high temperature portion rotor 2 and the low temperature portion rotor 42 exposed to the high temperature steam and the low temperature steam, respectively, is an important portion, as turbine moving blades are fitted therearound, and is made with the same structure as that of the first embodiment.

The weld portions A, B are made in the same weld structure as that of the first embodiment shown in FIGS. 2(a) and 2(b). Although illustration is omitted, the bearing portion rotor 1, as the opposite portion of the high temperature portion rotor 2 in FIG. 2(a), is replaced with the low temperature portion rotor 41, the low temperature portion rotor 3 in FIG. 2(b) is replaced with the low temperature portion rotor 42, and the weld portion C shown in FIG. 2(c) does not exist. Other portions of the construction being the same as those of the first embodiment, description thereon will be omitted.

Figure 6A:
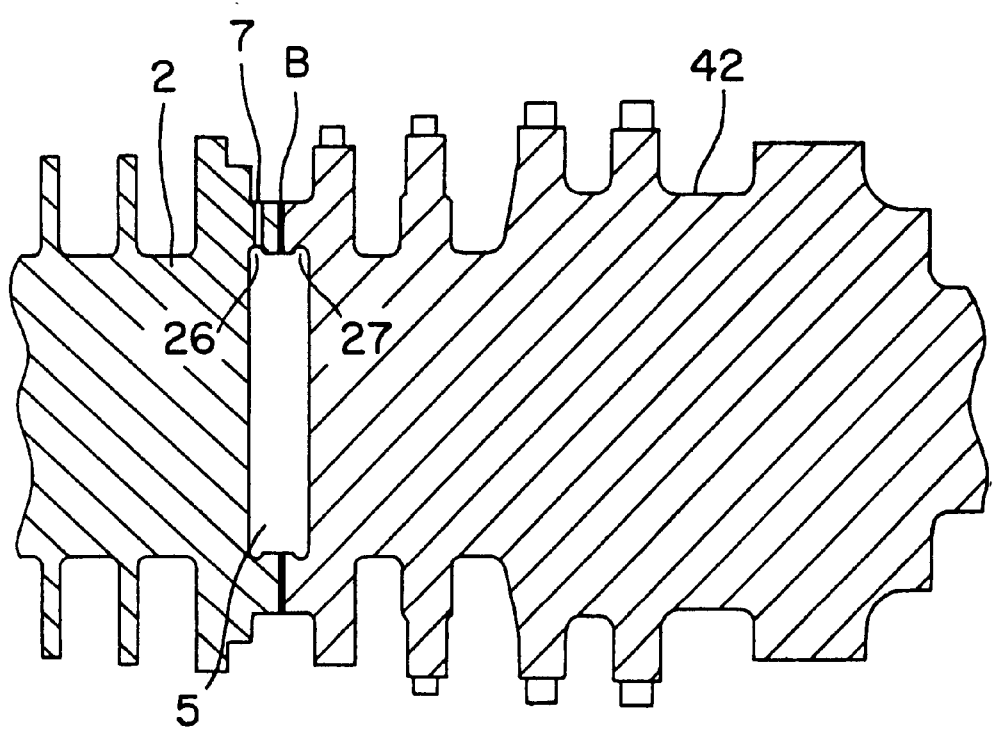
FIG. 6(a) is that of the weld portion B and FIG. 6(b) is a further enlarged cross sectional view of a joint portion of the weld portion B.
Figure 6B:
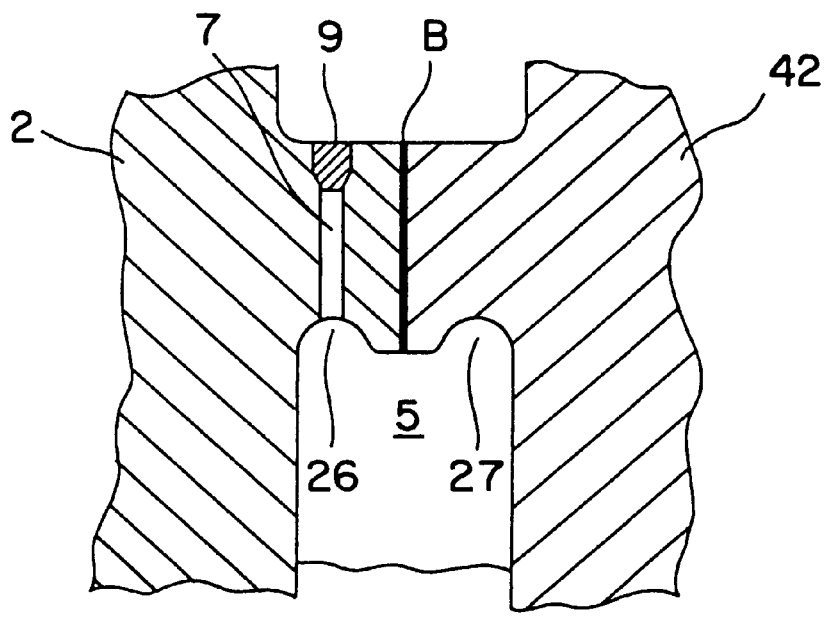
Figure 7:
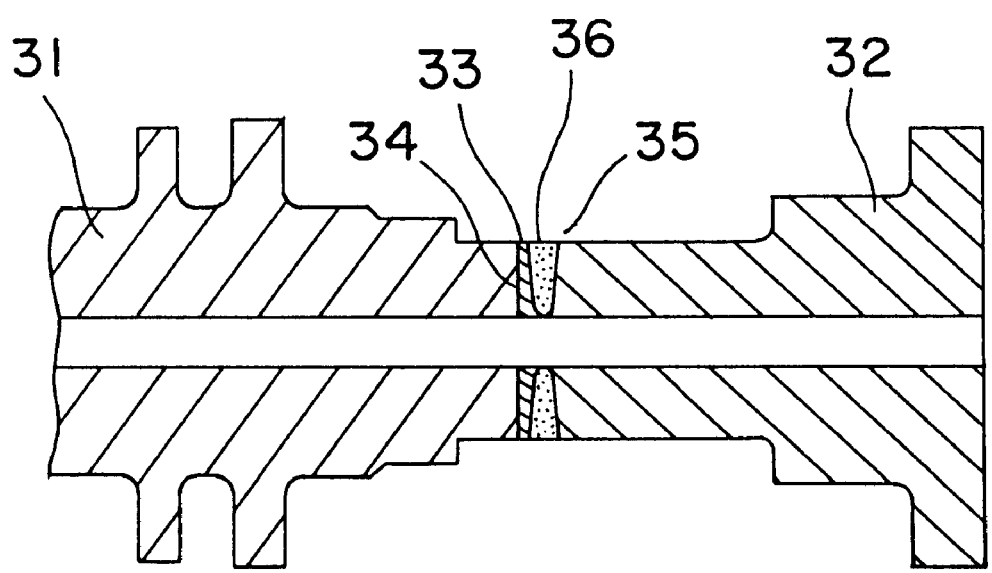
FIG. 7 is a partial cross sectional view of a steam turbine rotor in the prior art in which different materials are jointed together.

FIG. 6 is a partially enlarged cross sectional view of FIG. 5, wherein FIG. 6(a) is a view of the weld portion B and FIG. 6(b) is a further enlarged cross sectional view of a joint portion of the weld portion B. The structure of the weld portion B is basically same as that of the first embodiment shown in FIG. 3 with the weld portion C being omitted. In FIG. 6, there are provided recess portions 26, 27 in the weld portion B so that a cavity portion 5 is formed by a right and left pair of the recess portions 26, 27 in the joint portion. Further, there is provided an inspection hole 7 passing through from a rotor 2 outer circumferential surface to the cavity portion 5.

As in the first embodiment, the inspection hole 7 is provided in the high temperature portion rotor side having less thermal influence, and as shown in FIG. 6(b), a plug 9 is usually provided for sealing the cavity portion 5. When the inspection is to be done, the plug 9 is removed and a fiberscope or the like is inserted into the cavity portion 5 through the inspection hole 7 for inspection of the surroundings of the weld portion B. If the plug 9 is fitted in engagement via a thread or the like with the inlet portion of the inspection hole 7, fitting and removing the plug 9 will be facilitated. It is to be noted that, as in the first embodiment, the inspection hole is provided adjoining the weld portion in one piece of hole, or in plural pieces thereof as the case may be, along the rotor outer circumference.

According to the different material welded rotor of the second embodiment, as compared with the rotor of the first embodiment, the rotor joint portions are only at the two places of the weld portions A, B, without the weld portion C shown in FIG. 1, which results in an enhancement of the workability of the weld rotor. A fiberscope or the like can be inserted through the inspection hole 7 of the weld portion B and the same effect as in the first embodiment can be obtained.

It is understood that invention is not limited to the particular construction and arrangement herein described and illustrated but embraces such modified forms thereof as come within the scope of the appended claims.

What is claimed is:

1. A steam turbine different material welded rotor constructed by rotors divided into a high temperature portion and a low temperature portion and made of different materials being jointed together by welding, wherein a circular recess portion is provided in a central portion of an end face to be jointed of each of said rotors, an annular end face of a peripheral portion of said end face is jointed by welding to an annular end face of an adjacent one of said rotors so that a cavity portion is formed in the central portion of said end faces so jointed and an inspection hole is provided passing through from a rotor outer surface to said cavity portion.

2. A steam turbine different material welded rotor as claimed in claim 1, wherein said steam turbine different material welded rotor is constructed by rotors divided into a bearing portion, a high temperature portion and a low temperature portion and made of different materials being jointed together by welding.

3. A steam turbine different material welded rotor as claimed in claim 1, wherein there is provided a projection portion which projects inwardly toward a central portion of said cavity portion along a central portion of an inner circumferential surface of a jointed portion of said annular end faces.

4. A steam turbine different material welded rotor as claimed in claim 2, wherein there is provided a projection portion which projects inwardly toward a central portion of said cavity portion along a central portion of an inner circumferential surface of a jointed portion of said annular end faces.

* * * * *